United States Patent [19]

Epstein

[11] 3,754,936

[45] Aug. 28, 1973

[54] FLAVOR COMPOSITIONS AND PROCESSES

[75] Inventor: Martin F. Epstein, New City, N.Y.

[73] Assignee: General Foods Corporation, White Plains, N.Y.

[22] Filed: Mar. 31, 1971

[21] Appl. No.: 129,959

[52] U.S. Cl.................. 99/140 R, 99/65, 99/71, 260/615 A
[51] Int. Cl............................ A23f 1/12, A23l 1/26
[58] Field of Search.................. 99/140 R, 65, 71; 260/615 A

[56] References Cited
UNITED STATES PATENTS
2,622,101 12/1952 Paul et al........................ 260/615 A
3,522,317 7/1970 Schroeter.................. 260/615 A X
3,655,397 4/1972 Parliment........................ 99/65

Primary Examiner—Joseph Scovronek
Assistant Examiner—Stephen B. Davis
Attorney—Tomas V. Sullivan and Daniel J. Donovan

[57] ABSTRACT

Enhancement of foodstuffs, especially coffee flavored foodstuffs, is achieved by the addition of a small but effective amount of a compound of the formula:

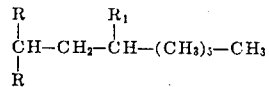

Wherein R is lower alkoxy and $R_1$ is lower alkoxy or hydroxy.

9 Claims, No Drawings

FLAVOR COMPOSITIONS AND PROCESSES

BACKGROUND OF THE INVENTION

The present invention relates to certain aliphatic alcohols or ethers found useful in the area of flavor alteration whether by enhancement of flavor characteristic in a substance, modification of flavor or by complete or partial masking of flavor. Still more particularly, the invention relates to incorporation of di- or tri-alkoxy nonanes and mixtures thereof in coffee to reduce the caramel, acid, and sour flavor of coffee; modify and improve the green, earthy, and buttery notes of coffee; and add a desirable woody, regular coffee flavor to the foodstuff. The compounds employed have particular application to soluble and regular coffee which is normally deficient in a woody flavor.

DESCRIPTION OF THE PRIOR ART

In the field of flavor enhancement, it has been general practice to employ synthetic and naturally isolated compounds and compositions to enhance or mask the flavor of foodstuffs. Generally, isolation of single flavors does not allow one to predict equivalent flavors since compounds of greatly differing structure have been found to produce approximately the same flavor character while compounds of similar structure frequently differ appreciably in taste. Consequently, the identification of desirable flavor components requires synthesis and trial of individual candidates until compounds are identified which have desirable flavors.

For many years, coffee technologists have searched for flavor enhancing compounds which would produce the flavor note generally described by coffee experts as "woody." Recently my colleagues and I have identified a number of woody-flavored 2-nonenals and 2-nonenols which have this character. In the course of synthesis of those compounds, I have discovered the compounds employed in the composition and process of this invention.

SUMMARY OF THE INVENTION

The general purpose of this invention is to provide several compounds and compositions containing these compounds which will enhance coffee flavored foodstuffs by imparting to them regular coffee flavor.

The flavor enhancement is achieved by the addition of a small but effective amount of:

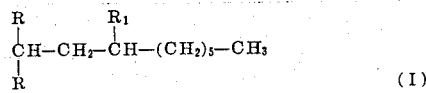

(I)

Wherein R is lower alkoxy and $R_1$ is lower alkoxy or hydroxy
to the foodstuff to be flavored. The compounds of Formula I and mixtures thereof produce a coffee flavor when added in minute amounts generally in parts per billion to water or foodstuffs.

It is an object of this invention to provide compounds of Formula I and mixtures thereof for the flavor alteration of foodstuffs, particularly coffee deficient of this flavor.

It is a further object of this invention to describe processes for employing the compounds of Formula I in concentrates useful for enhancing the flavor of foodstuffs, particularly coffee.

A still further object of this invention is to provide novel compounds for the flavor enhancement of foodstuffs.

A still further object is to provide compounds of Formula I to enhance the regular coffee flavor note generally described by experts as "woody," particularly for coffees deficient in that flavor, while balancing the overall flavor character and while masking the caramel, acid and sour flavor of coffee.

DESCRIPTION OF THE INVENTION

The compounds employed in the compositions and processes of this invention are characterized by the formula:

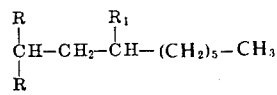

Wherein R is lower alkoxy and $R_1$ is lower alkoxy or hydroxy.

These compounds are prepared from 2-nonenal by reaction with trialkyl-orthoformate in alcoholic boron trifluoride etherate.

The trialkoxynonanes may also be prepared from 2-nonenal dialkyl acetals and p-toluenesulfonic in alcohol.

Representative of the compounds of Formula I are: 1,1,3-trimethoxynonane, 1,1,3-trimethoxynonane, 1,1,3-tripropoxy- nonane, 1,1-dimethoxy-3-hydroxynonane, 1,1-diethoxy-3- hydroxynonane and the like.

The compounds of Formula I are useful for enhancing the flavor of food. They enhance coffee flavored foodstuffs where a regular coffee flavor generally characterized by coffee experts as "woody" is desired but deficient—such as some regular coffees like Robustas, decaffeinated coffee, soluble coffee; and coffee flavored foods such as icings, drinks, Postum brand beverage, desserts, candies, and the like.

The compounds of Formula I and mixtures thereof give coffee flavor when added to water or foodstuffs. In addition to imparting to coffee a regular coffee-like flavor having a strong woody note, these compounds exert a balancing effect on other desirable coffee notes such as the green, earthy, and buttery flavors while masking the undesirable acid, sour, and caramel flavors. The compounds also exert a blending effect on the overall brew flavor of soluble coffee. The compounds of Formula I may be added to any coffee including soluble coffee, decaffeinated coffee either regular or soluble and regular roasted and ground coffee. The compounds of Formula I may also be incorporated with other coffee flavor fractions, both snythetic and those obtained from coffee, and with these flavors exert a balancing effect while strengthening the woody regular coffee flavor.

Depending on the flavor desired, the compounds of Formula I can be incorporated in the foodstuff either alone, combined with other flavor ingredients, or with carriers. In flavoring soluble coffee, the compounds of Formula I may be either added to regular coffee prior to extraction, to coffee percolate prior to drying, or may be plated on or mixed with the dried coffee. Since only a minute amount of the flavor and aroma compounds are needed, it is preferred to incorporate them in an edible carrier or concentrate prior to addition to the coffee. The concentrate or carrier may be liquid, syrup, or solid, depending on its ultimate use. For example, the compounds of Formula I may be incorporated in ethanol, propylene glycol; oils such as cottonseed, coffee, peanut, or the like; or other edible vehicles to form a concentrate for convenient shipping, storage, and addition to the foodstuff. For example, oil containing a compound of Formula I or mixtures thereof may be plated on soluble coffee to enhance its flavor or alternatively, the oil containing the flavor compound may be incorporated in extract and dried. Dry concentrates containing the compounds of Formula I or mixtures thereof may also be prepared by employing film-forming compositions such as gums--like gum arabic, pectins, alginates, and the like; starch breakdown products such as Capsul (National Starch), Morex 1918 (Corn Products), Maltrin 10 (Grain Process), and the like; candy melt systems and other art-recognized stabilizing or diluent systems. In forming any concentrate, the proportions of the compounds of Formula I therein is not critical provided the level of flavoring is controlled to give an enhanced coffee flavor and an even distribution of the flavor concentrate throughout the foodstuff to be flavored.

Minute amounts of the compounds of Formula I are sufficient to produce an enhancement of coffee flavor in food-stuffs. For example, in regular or soluble coffee beverages, say from about 1 to 1.5 percent solids, the compounds can be employed to produce a change in cup flavor and aroma but a change which cannot be described as a particular flavor. Alternatively, proportions sufficient to be recognized as "woody" may be employed.

The flavor impact of the compounds of Formula I and mixtures thereof is easily adjusted by varying the concentration of the flavoring compounds employed in the foodstuff. It is to be expected that adjustment will be necessary depending on the particular foodstuffs being flavored. Initial panel screening by those of ordinary skill in the art is used to determine the threshold and proper strength level for the particular foodstuff in which the flavor is employed.

The compounds of Formula I are particularly useful for balancing the natural flavor of spray-dried and freeze-dried soluble coffee, decaffeinated coffee both soluble and regular, and regular coffee of various blends or single variations, particularly those having high Robusta content. The flavor compounds are particularly preferred for imparting a woody flavor to the preceding coffees deficient, partially or totally, in that flavor. However, even at levels below the woody threshold level, balancing of flavor is noted by expert tasters. The flavor compounds of Formula I are also particularly useful when combined with steam-generated natural coffee aromas or enhancers where there is produced a blending or smoothing of coffee aroma and flavor and a masking of the undesirable sourness and caramel characteristics often associated with coffee. Similar improvement is noted for mixtures of synthetic and natural coffee aromas and flavors. In addition to the application of the compounds of Formula I in foodstuffs, these flavoring agents may also be employed in edible substances such as pharmaceuticals, where a woody regular coffee note is desired. The invention is now illustrated but not limited by the following examples.

EXAMPLE I

A. 2-Nonenal (8 g., 0.055 mole), triethyl orthoformate (14.8 g., 0.1 mole), ethyl alcohol (20 ml.) and boron trifluoride etherate (0.5 ml.) are refluxed for 2 hrs. The solution is diluted with 20 ml. ether, washed with 5 percent sodium bicarbonate followed by water. The ether solution is dried over anhydrous sodium sulfate, concentrated and distilled under vacuum. A fraction is collected at 50°–75° C/O 0.08 mm. Further purification by gas chromatography (diethylene glycol succinate column) yields 1,1,3-triethoxynonane.

Spectral Data:
  ir spectrum (Perkin-Elmer 521); Neat, 3.35(s), 3.42(s), 3.48(s), 6.84(w), 6.88(w), 6.94(w), 7.3(s), 7.45(w), 9.0(s),9.21(s), 10.0(w).
  nmr ($CDCl_3$, TMS) $\sigma$1.2(m, 24H), 3.46(m, 7H), 4.63(M, 1H).
Mass Spec.
  Major Spec.
  Major peaks 103, 47, 57, 75, 85, 55, 41, 83, 43, 69, 111, 171, 129, 143.

B. When triethyl orthformate is replaced by trimethyl orthoformate and the ethyl alcohol replaced by methyl alcohol, there is produced 1,1,3-trimethoxynonane.

When similar replacements are made using other tri-lower alkyl orthoformate compounds, the equivalent tri-alkyl orthoformate is produced.

EXAMPLE II

2-Nonene diethyl acetal (4.2 g., 0.02 mole) ethyl alcohol (20 ml.) and p-toluenesulfonic acid (10 mg.) are refluxed under nitrogen for 2 hrs. The reaction mixture is worked up as previously described in Example I and 1,1,3-triethoxynonane is obtained by gas chromatography.

Other 2-nonene di lower alkyl acetals are converted in a similar manner to prepare the equivalent 1,1,3-tri lower alkoxy nonene.

The 3-hydroxy derivative is prepared as in Example IV.

EXAMPLE III

Roasted coffee extract is prepared from roasted and ground coffee by normal commercial techniques to obtain a percolate having a solids concentration of anywhere from 15–50 percent coffee soluble solids. Sufficient 1,1,3-triethyoxynonane is added to the percolate to product a woody natural coffee flavor. The mixture is placed in cooled trays and frozen at a thickness of less than one-half inch. A frozen mixture of extract and aroma is then freeze dried in a commercial drying unit to produce a freeze dried coffee having enhanced woody flavor.

Instead of freeze drying the enhanced percolate, it may be spray dried instead. If desired, a portion of the percolate may be employed to fix the flavor compound by any known drying procedure and then mixed with unenhanced dried soluble coffee.

EXAMPLE IV

In a 500 ml. 3-necked flask cooled to -78° C. is placed 250 ml. of a 0.40 molar solution of butyl lithium (0.1 mole).

(Beta) bromoacetaldehyde diethyl acetal (19.7 g., 0.1 mole) in 75 ml. of ether is cooled to −15° C. and is added over 1 minute with rapid stirring. After one-half hour, n-heptanal (11.4 g., 0.1 mole) in 25 ml. ether is added dropwise. After 3 hours, the mixture is allowed to warm to room temperature and hydrolyzed with ammonium chloride (5.3 g., 0.1 mole) in 100 ml. of water. The mixture is diluted with water and the organic layer separated. The organic layer is washed with water, dried over sodium sulfate and distilled to give 1,1-diethoxy-3-hydroxy nonane.

The 1,1-dialkoxy-3-hydroxy nonane is prepared from the lithium reagent and n-heptanal as illustrated.

I claim:

1. A process for enhancing the flavor of foodstuffs comprising adding thereto a compound of the formula:

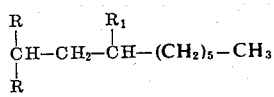

wherein R is lower alkoxy and $R_1$ is lower alkoxy or hydroxy and mixtures thereof, in an amount sufficient to enhance the flavor of the foodstuffs.

2. The process of claim 1 in which the foodstuff is coffee.
3. The process of claim 2 in which the coffee is decaffeinated coffee.
4. The process of claim 3 in which the coffee is regular roasted and ground coffee.
5. The process of claim 4 in which the coffee is soluble coffee.
6. The process of claim 5 in which the coffee is freeze dried soluble coffee.
7. A foodstuff having as an active flavoring ingredient the compound of the formula:

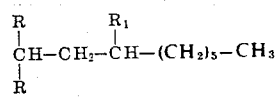

wherein R is lower alkoxy and $R_1$ is lower alkoxy or hydroxy in an amount sufficient to enhance the flavor of the foodstuff.

8. The foodstuff of claim 7 wherein the foodstuff is coffee.
9. The foodstuff of claim 7 wherein the flavoring ingredient is triethoxynonane.

* * * * *

UNITED STATES PATENT OFFICE
CERTIFICATE OF CORRECTION

Patent No. 3,754,936　　　　　　　　Dated August 28, 1973

Inventor(s) Martin F. Epstein

It is certified that error appears in the above-identified patent and that said Letters Patent are hereby corrected as shown below:

In the Abstract, before "$-CH_3$" and after "$-\overset{\overset{\displaystyle R_1}{|}}{CH}-$" change "$-(CH_3)_5-$" to $-(CH_2)_5-$.

In Column 2, line 30, after "1,1,3-trimethoxynonane," change --1,1,3-trimethoxynonane,-- to --1,1,3-triethoxynonane,--

In Column 2, line 31, before "1,1-dimethoxy-3-" change "1,1,3-tripropoxy- nonane," to 1,1,3-tripropoxynonane, In Column 3, line 28, before "For" and after "in" change "food-stuffs." to --foodstuffs.--.

In Column 3, line 29, before "solids," and after "percent" insert --coffee--.

In Column 4, Line 52, before "a woody" and after "to" change "product" to --produce--.

In Column 6, Line 7, before "in" and after "claim" change "4" to --3--.

Signed and sealed this 5th day of March 1974.

(SEAL)
Attest:

EDWARD M. FLETCHER, JR.
Attesting Officer

C. MARSHALL DANN
Commissioner of Patents